June 29, 1943.   W. M. McNEIL   2,322,965
TREAD CONSTRUCTION
Filed July 23, 1941   2 Sheets-Sheet 1
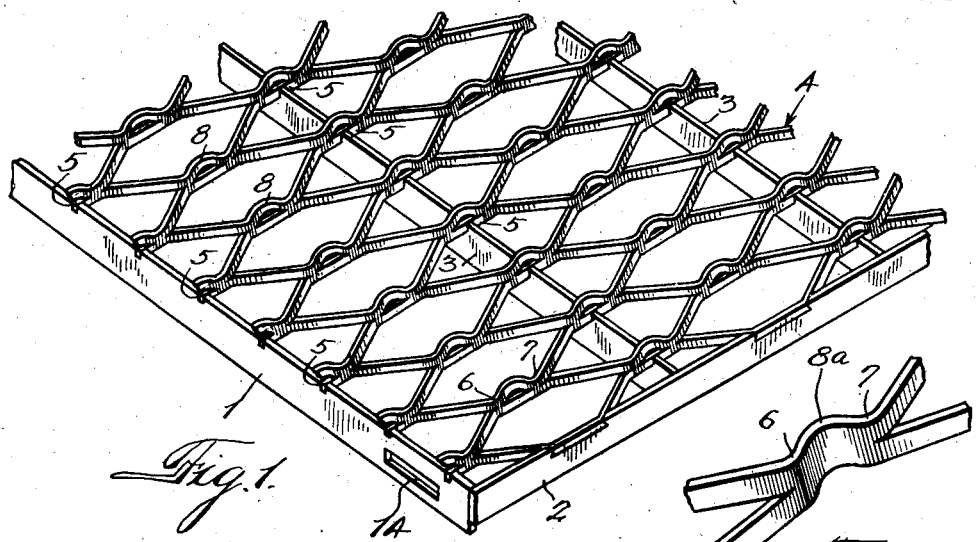
Fig. 1.
Fig. 5.
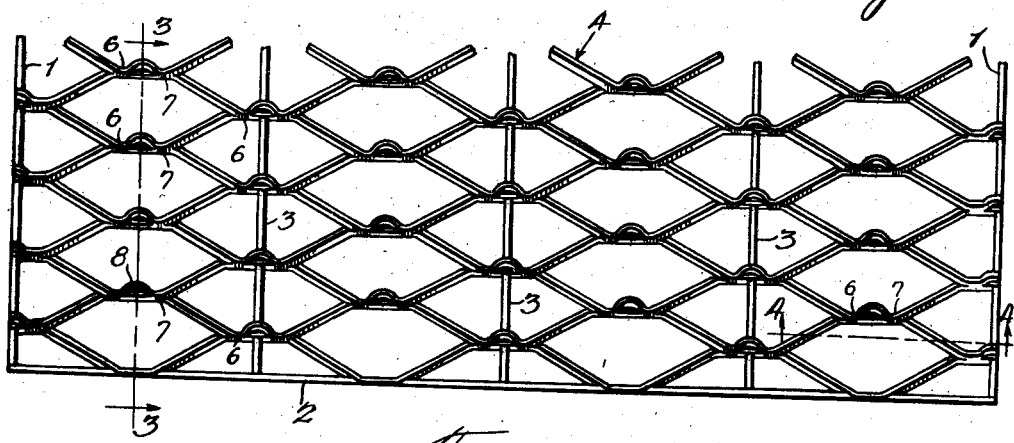
Fig. 2.
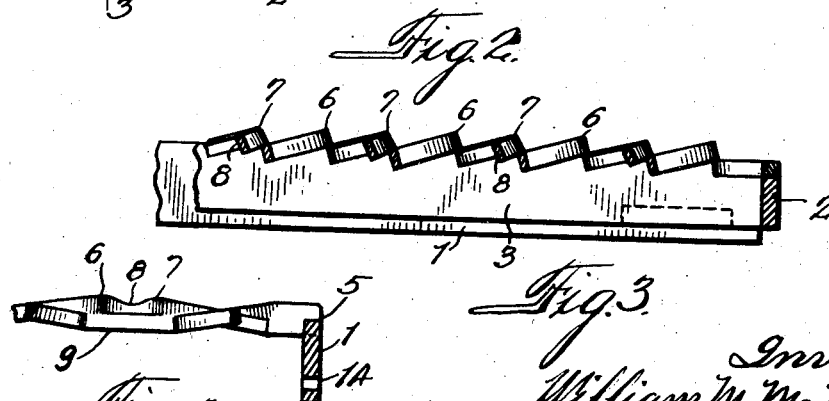
Fig. 3.
Fig. 4.
Inventor
William M. McNeil
By Thiess, Olsen & Muchlenberger
Attys.

June 29, 1943.   W. M. McNEIL   2,322,965
TREAD CONSTRUCTION
Filed July 23, 1941   2 Sheets-Sheet 2
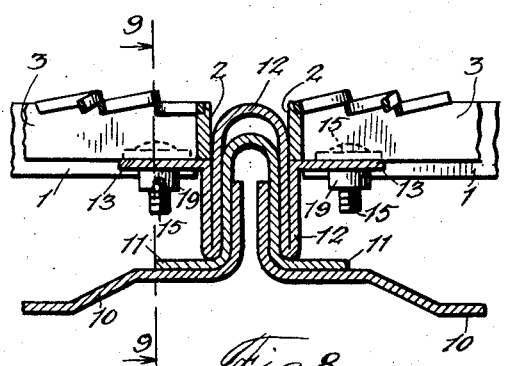
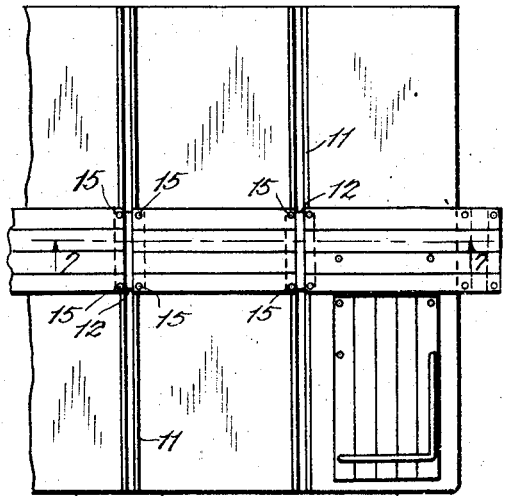
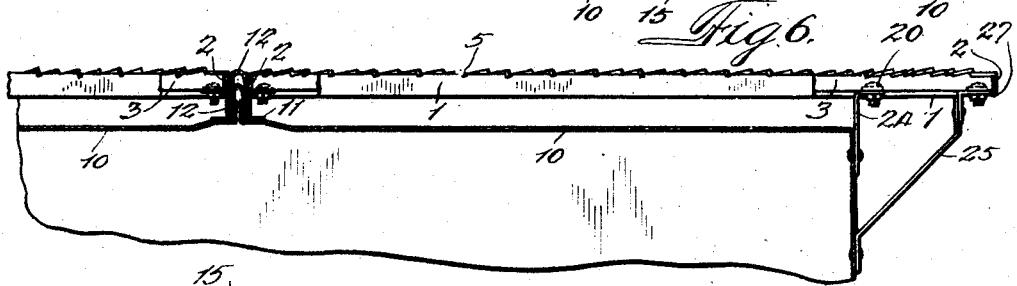
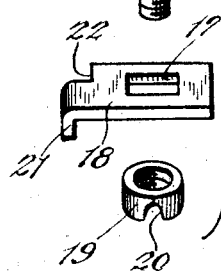
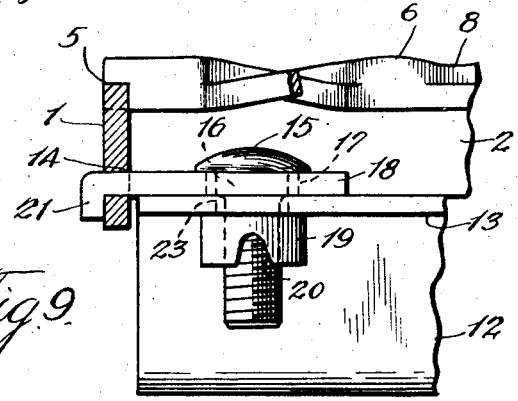
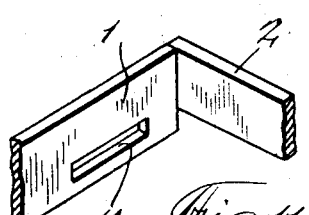
Inventor
William M. McNeil
By Thiess, Olson & Mecklenburger
Attys.

Patented June 29, 1943

2,322,965

UNITED STATES PATENT OFFICE 2,322,965

TREAD CONSTRUCTION

William M. McNeil, Wheaton, Ill., assignor to United States Gypsum Company, Chicago, Ill., a corporation of Illinois Application July 23, 1941, Serial No. 403,741

9 Claims. (Cl. 189—34)

This invention relates to treads and more particularly to an improved metal tread construction which is light, economical to manufacture, and has high anti-skid characteristics. This invention also includes a new and improved hold-down means for anchoring treads of the character disclosed.

The present invention is adapted to use wherever anti-skid tread surfaces are required, such as in building constructions, factory walks and platforms, catwalks or running boards on freight cars and ships, and the like.

Heretofore it has been proposed to employ expanded metal for tread surfaces and to support the same by metal frameworks. The present invention is an improvement over such prior constructions.

It is an object of this invention to provide a sectional tread construction, individual sections of which may be removed or replaced independently of the rest of the sections and with a minimum of time and effort. To this end improved anchoring means are provided which cooperate with properly formed portions of the tread sections to securely anchor the sections, yet to permit their speedy removal when desired.

It is an additional object of this invention to provide a new and improved tread surface comprising expanded metal having portions formed to increase the anti-skid characteristics thereof.

One of the important features incident to the use of an open mesh tread of the character disclosed lies in its self-cleaning characteristics, whereby ice, snow, and the like may pass or be forced through the openings in the tread, leaving the anti-skid surface thereof always uppermost, clean and available as a tread. In order to provide this self-cleaning characteristic, it is important that the meshes employed be of sufficient size readily to permit ice and snow to fall or be forced therethrough without caking or glazing so as to build up a coating of ice. However, this must be done without impairment of the anti-skid characteristics of the tread or the loss of structural strength, and the manner in which this is accomplished in the present construction will be described in detail hereinafter.

The invention comprises an expanded metal construction having open meshes of the desired large size but in which, by reason of the peculiar anti-skid formation and the particular combination with the supporting framework, there is no reduction of structural strength.

The usual sharp line upper edge contours of expanded metal having inclined bonds are utilized to the fullest extent to prevent skidding longitudinally of the tread sections and the bonds are specially formed to prevent skidding in a transverse direction.

An additional feature of the invention is the provision of a unitary tread and framework construction, the tread being welded into and becoming an integral part of the framework so that maximum strength is assured.

For purposes of illustration, the accompanying drawings disclose an embodiment of the invention as applied to a railway freight car roof. It is of course equally adapted to any other use of a comparable nature or involving similar requirements.

In the drawings, Fig. 1 is a perspective view of one corner of a tread section as it appears from above;

Fig. 2 is a top plan view showing one end of a section of the character disclosed in Fig. 1;

Fig. 3 is a view partly in side elevation and partly in section taken on a line corresponding to line 3—3 of Fig. 2, but on a somewhat larger scale;

Fig. 4 is a view partly in end elevation and partly in section taken on a line corresponding to line 4—4 of Fig. 2, on the same scale as Fig. 3;

Fig. 5 is a fragmentary perspective view on a still larger scale, showing another form of expanded metal bond which may be used in an alternative embodiment of this invention;

Fig. 6 is a top plan view, on a reduced scale, of one end of a railway freight car showing how the tread may be arranged in sections along the top thereof to provide an anti-skid running board;

Fig. 7 is a sectional view along the line 7—7 of Fig. 6 but on a larger scale, showing the manner in which the sections may be secured to a freight car roof;

Fig. 8 is a detailed enlargement of a portion of Fig. 7;

Fig. 9 is a detailed side elevational view substantially on line 9—9 of Figure 8, partly in section and on a still larger scale, of the anchoring or hold-down means employed to secure the sections to the car roof;

Fig. 10 is an exploded view of the fastening means shown in Fig. 9, at approximately the same scale as Figs. 3 and 4; and Fig. 11 is an inside view of a corner of the framework before the expanded metal has been added and showing the slot into which the anchoring or hold-down means engages, this view also being at approximately the same scale as Figs. 3 and 4.

Referring to the drawings in detail, the embodiment illustrated in Figs. 1 to 4, inclusive, comprises side bars 1 and end bars 2 of rectangular cross section, positioned on edge and welded together at the ends to form a rectangular frame. A plurality of spaced longitudinal bars 3 of similar shape but which may be of slightly less depth are also secured to the end bars 2 and lie between and parallel to the side bars 1. Over the framework so formed is positioned a tread of expanded metal 4 of the character hereinafter described in detail. This expanded metal tread is preferably secured in place by welding or the like, as at points 5, so that an integral bond is achieved between the expanded metal and the frame.

With the framework so constructed and the expanded metal secured thereto in the above manner, it will be seen that a remarkably strong and secure tread structure is provided which is characterized by a minimum of weight and a maximum resistance to stresses from all directions. This strength is augmented by the manner in which the mesh of the expanded metal is proportioned with respect to the framework and to the longitudinal bars to which it is secured at spaced intervals.

The expanded metal 4 may be of relatively large mesh as shown, and may be so formed that its bonds are inclined with respect to the plane of the sheet. The upper edge portions 6 and 7 of the bonds present to the upper surface a plurality of sharp line edges to form the tread surface.

The bonds of this expanded metal are preferably relatively long as shown and provided with central partial corrugations 8 which serve to deflect the upper line edges of the central parts of the bonds laterally and below those of the extremities of the bonds, to leave separate, upwardly presented, sharp line edges 6 and 7. Fig. 4 particularly discloses the manner in which the central portion 8 of the bond is spaced below the plane of the portions 6 and 7.

With an expanded metal sheet having partial corrugations of the character disclosed and in which the bonds are partially sunk into and merged with the intermediate bars 3, to which they are welded, the uncorrugated bottom portion 9 of a series of bonds may be brought to rest upon, or, if desired, also welded to, the intermediate bar 3 to be strengthened thereby.

Alternatively, the bonds of the expanded metal may be provided with corrugations extending completely across their width, as shown in the detailed view, Fig. 5, wherein the central portion 8ᵃ of the bond is uniformly corrugated from side to side. Additional variations of these embodiments may be employed within the scope of this invention.

Figs. 6 to 11 disclose a preferable mode of securing or anchoring the tread sections to a suitable support, Fig. 6 particularly disclosing the arrangement of sections on a railway freight car roof to form a longitudinal running board and a transverse crosswalk at the end.

Fig. 7 shows the manner in which sections may be spaced from and secured to a freight car roof. In this figure an all-steel freight car is illustrated, comprising car roof sections 10 which may be secured together at intervals by the usual transverse steel roof seams or carlines 11 to form a watertight joint. These carlines 11 may be welded or otherwise secured to the sections 10 so that an integral roof construction is provided. Running board saddles 12 in the shape of an inverted U and having oppositely extending ledges 13 as shown may be centrally positioned over the roof seams or carlines and may be secured thereto by welding or other suitable means.

The side rails 1 of the tread sections overhang the ends of the saddles 12 and are provided adjacent each end with a longitudinally extending slot 14, into which the anchoring means may be secured. As shown in detail in Figs. 9 and 10, this anchoring or hold-down means preferably comprises a bolt 15 having a squared shank portion 16 adapted to fit into the rectangular hole 17 of an anchor plate 18 and be restrained from rotation thereby, and a cooperating nut 19 having a wrench engaging slot 20.

The slot 14 is preferably of sufficient size and length that the anchor plate 18 may be bodily inserted into place through said slot when the construction is being assembled, and then may be moved toward the end of the section as far as the cut away portion 22 will permit or until the hole 17 registers with a bolt hole 23 provided in the adjacent laterally extending ledge or flange 13 of the saddle 12. The bolt 15 may then be inserted from above through the mesh of the expanded metal and the nut 19 secured in place.

The rectangular slot 17 in the anchor plate 18 may be elongated to permit limited lateral adjustment of the anchor plate and the tread section. The elongated slot 14 permits longitudinal adjustment of the section.

When secured to the saddle by the above means which may be positioned both at the corners of a section, as indicated in Fig. 6, and intermediate thereof if desired, the end bars 2 and the intermediate bars 3 of each section are rigidly held in contact with the ledges 13 of the saddles against which they abut.

The usual overhanging ends of the running board may be supported in any suitable manner, as by the supporting arms 24 and 25, which have ledges 26 and 27 corresponding to the ledges of the saddles just discussed, and anchor plates and bolts as above described may likewise be used for securing the sections to these supports.

It will be obvious that, by this arrangement, a readily removable sectional tread surface is provided, the individual sections of which are anchored in place by a minimum number of readily accessible parts. It will likewise be apparent that the sections are securely supported so as to possess all the required strength, but that the means of supporting the section may permit a slight movement, if necessary, so that the tread may accommodate itself to the weaving and twisting stresses which may be imposed thereon, as by the flexing of a railway car while in motion.

It has been found that a satisfactory tread for normal use may be made from expanded metal which has been formed from about $\tfrac{3}{32}$ inch stock. It should preferably be provided with bonds and strands each about 1⅜ inches long. Expanded metal so formed permits the structural frame members to be spaced on centers of about 5 inches and to be located along alternate rows of bonds as shown in Figs. 1 and 2, which is a desirable arrangement.

A tread made in the above manner is light and has hexagonal openings properly proportioned to prevent excessive accumulation of ice and snow thereon, and, when supported as shown, is of sufficient strength and rigidity to resist the stresses incident to its use. In addition, the offset intermediate portions of the bonds form pairs of sharp line edges offering great resistance to slippage in any direction and thus assuring a proper and sufficient anti-skid tread surface. It will be seen that such surface is constituted by angularly presented edges having relatively closely spaced portions which are of undulating form when viewed either from above or from the side. Such edges have been found to be particularly effective to prevent skidding in any direction, since the soles and heels of the footgear worn by the workmen using walks or treads of this character are soft enough to engage themselves around the edges of the tread with an extremely tight grip.

While only certain specific embodiments of the invention have been shown and described herein, it will be understood by those skilled in the art that various changes and modifications may be made in the details of construction and arrangement of parts, without departing from the spirit and scope of the invention as set forth in the appended claims.

I claim:

1. An anti-skid tread construction comprising an expanded metal sheet having inclined bonds, said bonds having sharp line upper edges, a portion of some of said bonds being laterally and downwardly formed to present an undulating sharp line tread surface.

2. A tread construction comprising a framework having a plurality of spaced parallel bars and a tread surface comprising an expanded metal sheet member having strands and bonds, said parallel bars being spaced to lie adjacent alternate rows of bonds and being welded thereto to form an integral structure, each of said bonds being in a plane angular to the plane of said sheet and having an intermediate upper marginal portion deformed laterally from the plane of said bond so that the upper edge of said deformed portion is below said tread surface.

3. An expanded metal sheet forming an open mesh tread, said sheet having bonds inclined with respect to the plane of the sheet to provide a tread surface presenting a plurality of upwardly directed sharp line edges, each of said bonds having a transverse partial corrugation adjacent and including its upwardly directed sharp line edge and dividing said edge into spaced tread portions, the peaks of said corrugations extending angularly downward from the plane of said tread.

4. An expanded metal sheet forming an open mesh tread, said sheet having bonds inclined with respect to the plane of the sheet to provide a tread surface presenting a plurality of upwardly directed sharp line edges, each of said bonds having a transverse corrugation with the peak on the downward side of said bond and including its upwardly directed sharp line edge and dividing said edge into spaced tread portions.

5. A tread construction comprising a framework having a plurality of spaced parallel bars and transverse interconnecting members, an expanded metal open mesh tread surface intimately joined to said framework and having strands and bonds, said bonds being inclined at an acute angle with respect to the plane of the tread surface so that the upper corners of the bonds present a plurality of upwardly directed sharp line edges, intermediate portions of said bonds being laterally displaced toward the obtuse angle side thereof so that the sharp line corner edges of the bonds are likewise displaced, said framework having means for securing said tread construction to a support.

6. A tread construction comprising a plurality of tread sections having a number of inner and outer spaced longitudinally extending reinforcing bars, a tread surface of open mesh metal fabric secured to said bars, the outer bars being of greater depth than the inner bars and coincident with the outer edges of said tread, section supporting saddles positioned at adjoining ends of adjacent sections, said saddles being of a length less than the distance between said outer bars whereby the outer bars overhang the ends of the saddles, the outer bars having openings adjacent each end, and anchor means mounted on the saddles and engaging said openings to secure the section in place.

7. An anti-skid tread construction comprising a sheet of expanded metal having strands and elongated bonds, said bonds being angularly positioned relative to the plane of the sheet so that each bond would normally present only a continuous sharp straight line corner in the plane of the tread surface, each bond being deformed intermediate its ends to distort said sharp line corner downwardly out of the plane of said tread and laterally out of the plane of said bond without breaking the continuity of said sharp edge.

8. An anti-skid tread construction comprising a sheet of expanded metal having strands and elongated bonds, said bonds being angularly positioned relative to the plane of the sheet so that each bond would normally present only a continuous sharp straight line corner in the plane of the tread surface, each bond being deformed intermediate its ends to distort said sharp line corner downwardly out of the plane of said tread and laterally out of the plane of said bond so that said sharp edge is a sinuous line in a plane at an acute angle to said thread surface with the peaks of said sinuous line in the plane of the tread surface.

9. An anti-skid tread construction comprising a sheet of expanded metal having elongated bonds at an acute angle to the plane of the sheet with the upper corner edge of the bond forming a tread surface, each bond being slit longitudinally as by shearing, the portion of said bond above said slit and including said upper corner edge being corrugated toward the obtuse angle side of said bond so that the major portion of the said upper corner edge of said corrugated portion is below the plane of said tread surface.

WILLIAM M. McNEIL.